UNITED STATES PATENT OFFICE.

JOHANN APPELT, OF REICHENBERG, BOHEMIA, AUSTRIA-HUNGARY.

COMPOUND FOR COVERING DRAWING-ROLLERS, &c.

SPECIFICATION forming part of Letters Patent No. 303,969, dated August 26, 1884.

Application filed August 21, 1883. (No specimens.)

*To all whom it may concern:*

Be it known that I, JOHANN APPELT, a subject of the Emperor of Austria, residing in Reichenberg, Bohemia, in the Empire of Austria, have invented a new and useful Compound for Covering Drawing-Rollers Employed in Spinning Machinery, and other Rollers, of which the following is a specification.

My new compound, used as covering for the drawing-rollers employed in spinning machinery or for other rollers, affords the great advantage over the usual coverings of drawing-rollers made of leather or india-rubber, in that it is neither attacked by fatty or oleic acid nor the atmospheric air, nor liable to a considerable wearing.

My compound is prepared in the following manner: Fifty pounds of gelatine are dissolved in two hundred and fifty pounds of pure warm water, and then added thirty pounds of glycerine of 26° Baumé, fifteen pounds of a three per cent. strength solution of tannin or bichromate of potash, and three pounds of spirits of camphor. All these ingredients are smelted together in a water bath of 167° Fahrenheit, and mingled by agitation. The so-prepared compound may either be poured in a layer of the required thickness over a convenient web, to which the mass adheres very firmly, or the rollers may be circumfused with the compound. The latter is of excellent elasticity, and the drawing-rollers covered with the compound or with cloth coated with the same are very durable. If there is required a softer material, the proportions of glycerine and spirits of camphor are to be increased, while a greater proportion of solution of tannin or bichromate of potash renders the compound more resistive. The solution of tannin or bichromate of potash hardens the mass. A more superficial hardening may also be effected on rollers made of the ordinary mass, consisting only of gelatine and glycerine, by coating their surface with a solution of bichromate of potash or tannin.

The object and use of camphor in this compound is to retain the very useful quality of elasticity in the glycerine, and from a number of experiments carried on practically for a great length of time it is found that by the same this elasticity is not only retained, but likewise increased. Besides this effect from the addition of camphor, the same insures a more homogeneous mass and prevents the formation of air-bubbles, and the danger of cracking on the surface while cooling. It accelerates, likewise, the operation, as ten to fifteen minutes is the longest time required to cover a roller and remove the same from the mold.

What I claim, and desire to secure by Letters Patent of the United States, is—

The herein-described compound, consisting of water, glycerine, gelatine, solution of tannin, and spirits of camphor, substantially in the proportions specified, and for the purposes described.

In witness whereof I have hereunto signed my name in the presence of two subscribing witnesses.

JOHANN APPELT.

Witnesses:
 LEO SEKELES,
 ROBERT NEWEKLOW.